US012533689B2

(12) United States Patent
Lutz et al.

(10) Patent No.: US 12,533,689 B2
(45) Date of Patent: Jan. 27, 2026

(54) ANGLE ADAPTER FOR A POWDER SPRAY DEVICE

(71) Applicant: Wagner International AG, Altstätten (CH)

(72) Inventors: Gilbert Lutz, Kriessern (CH); Ignaz Hutter, Altstätten (CH); Kurt Seitz, Widnau (CH); Eugen Loos, Tettnang (DE); Michaela Wenger, Altstätten (CH)

(73) Assignee: Wagner International AG, Altstatten (CH)

( * ) Notice: Subject to any disclaimer, the term of this patent is extended or adjusted under 35 U.S.C. 154(b) by 354 days.

(21) Appl. No.: 18/304,984

(22) Filed: Apr. 21, 2023

(65) Prior Publication Data

US 2023/0338973 A1 Oct. 26, 2023

(30) Foreign Application Priority Data

Apr. 25, 2022 (EP) .................................... 22169629

(51) Int. Cl.
*B05B 5/04* (2006.01)
*B05B 5/03* (2006.01)
(Continued)

(52) U.S. Cl.
CPC ............ *B05B 5/0418* (2013.01); *B05B 5/032* (2013.01); *B05B 5/0533* (2013.01); *B05B 5/1683* (2013.01)

(58) Field of Classification Search
CPC ..... B05B 5/0418; B05B 5/032; B05B 5/0533; B05B 5/1683
(Continued)

(56) References Cited

U.S. PATENT DOCUMENTS 5,761,965 A * 6/1998 Dahlquist .................. B25J 9/04 901/26
6,817,553 B2 * 11/2004 Steur ................... B05B 13/0431 239/443
(Continued)

OTHER PUBLICATIONS

Sames Kremlin, Inogun a FCC Operator's Manual, Sep. 2020, https://prolak.si/wp-content/uploads/2021/01/Inogun-A-instructions-manual-sames-kremlin-7133-uk.pdf with English translation, retrieved on Apr. 20, 2023.

*Primary Examiner* — Steven M Cernoch
(74) *Attorney, Agent, or Firm* — Renner, Otto, Boisselle & Sklar, LLP

(57) ABSTRACT

The angle adapter according to the invention for a powder spray device comprises an upstream housing, which has an upstream powder channel, a connection to the powder spray device, and a longitudinal axis, about which the housing can be rotated. The powder spray device additionally comprises a pivot body comprising a downstream powder channel, which connects to the upstream powder channel The pivot body can be pivoted about a pivot axis, whereby the pivot axis runs obliquely to the longitudinal axis. A nozzle is additionally provided, which connects to the pivot body. Several webs and grooves are provided at the housing and pivot body, whereby the webs protrude into the grooves, and the webs and grooves are formed so that they form a labyrinth. A high voltage line is furthermore provided, which extends from the upstream housing via the pivot body all the way into the nozzle and which is formed there as high voltage electrode.

24 Claims, 11 Drawing Sheets

(51) Int. Cl.
*B05B 5/053* (2006.01)
*B05B 5/16* (2006.01)

(58) Field of Classification Search
USPC ...................... 81/177.8, 177.9, 57.13, 57.39; 239/690–708
See application file for complete search history.

(56) References Cited

U.S. PATENT DOCUMENTS 9,901,942 B2 * 2/2018 Nolte ...................... B05B 5/005
2022/0016653 A1 * 1/2022 Tobler ................... B05B 7/1472

* cited by examiner

ANGLE ADAPTER FOR A POWDER SPRAY DEVICE

This application claims priority of European Patent Application No. 22169629.7 filed Apr. 25, 2022, which is hereby incorporated herein by reference in its entirety.

TECHNICAL FIELD

The invention relates to an angle adapter for a powder spray device for spraying coating powder.

During the powder coating, the workpiece to be coated is covered with a powder layer with the help of a powder spray applicator. The workpiece coated with powder is subsequently heated until the powder melts and a closed layer forms. After the layer has cooled down, it forms a closed protective layer, which adheres firmly to the workpiece. A powder spray applicator suitable for this purpose has a powder-conveying line, which leads into a powder spray nozzle on the outlet side. The coating powder to be sprayed is sprayed through the powder spray nozzle.

In order to attain an optimal coating of the workpiece, it is generally recommended to adapt the spray direction of the powder spray applicator to the geometry of the workpiece to be coated. When the powder spray applicator sprays the powder only to the front in the longitudinal direction, it may happen that certain regions cannot be sprayed sufficiently therewith in the case of certain workpieces. This is the case, for example, when the workpiece has an inner space, the surface of which cannot be sprayed or cannot be sprayed sufficiently via a powder jet, which is aligned only in the longitudinal direction.

In order to avoid this disadvantage, an angle adapter can be provided on the downstream side of the spray applicator. The powder spray direction can thus be changed, so that the spray direction no longer runs in the longitudinal direction but is pivoted at a defined angle with respect to the longitudinal direction. This angle will be referred to hereinafter as pivot angle.

PRIOR ART

A powder spray gun for spraying coating powder, which can be equipped with such an angle adapter, is known from the instruction manual Inogun A of Sames Kremlin (https://www.manualslib.de/manual/730827/Sames-Kremlin-Inogun-A-Fcc.html#manual). The angle adapter is available in two models, namely as so-called 60° nozzle adapter and as 90° nozzle adapter. When the 60° nozzle adapter is screwed to the gun barrel of the spray gun, the spray jet is pivoted at a pivot angle of 60° with respect to the longitudinal axis. The nozzle adapter can be rotated about the longitudinal axis of the gun barrel. The angle of rotation of the spray direction can thus be set. However, it is not possible to change the pivot angle from 60° to 90° during the coating. To accomplish this, the 60° angle adapter has to be unscrewed, and the 90° angle adapter has to be screwed to the gun barrel. Only then is the powder spray gun operational again. The angle of rotation of the powder spray jet, but not the pivot angle thereof can thus be set in the case of the 60° angle adapter as well as in the case of the 90° angle adapter.

DESCRIPTION OF THE INVENTION

It is an object of the invention to specify an angle adapter for a powder spray device, in the case of which not only the angle of rotation, but also the pivot angle of the powder spray direction can be set.

It is to simultaneously be ensured that, independently of the set spray direction, the high voltage can reach the outside, thus to the outer side of the angle adapter, only at the electrode and not already further upstream.

It is ensured in an advantageous manner by means of the angle adapter according to the invention that the high voltage, independently of the set spray direction, can always be conducted to the nozzle or to the high voltage electrode, respectively.

It is also ensured in an advantageous manner in the case of the angle adapter according to the invention that gas, which is to flush around the high voltage electrode, can always be conducted to the high voltage electrode, independently of the set spray direction.

The object is solved by means of an angle adapter for a powder spray device comprising the features specified in patent claim 1.

The angle adapter according to the invention for a powder spray device comprises an upstream housing, which has an upstream powder channel, a connection to the powder spray device, and a longitudinal axis, about which the housing can be rotated. The powder spray device additionally comprises a pivot body comprising a downstream powder channel, which connects to the upstream powder channel. The pivot body can be pivoted about a pivot axis, whereby the pivot axis runs obliquely to the longitudinal axis. A nozzle is additionally present, which connects to the pivot body. Several webs and grooves are located at the housing and at the pivot body, whereby the webs protrude into the grooves, and the webs and grooves are formed so that they form a labyrinth. The angle adapter furthermore has a high voltage line, which extends from the upstream housing via the pivot body all the way into the nozzle and which is formed there as high voltage electrode.

Advantageous further developments of the invention follow from the features specified in the dependent patent claims.

In the case of an embodiment of the angle adapter according to the invention for a powder spray device, the powder channel is formed so that the upstream powder channel tapers in the flow direction, and the downstream powder channel widens. It can thus be attained that the powder flowing through the angled region of the powder channel is distributed more homogenously in the downstream powder channel afterwards.

In the case of a further embodiment of the angle adapter according to the invention, a gas line is provided, in the case of which a portion of the gas line leads through the upstream housing, and another portion of the gas line leads through the pivot body. The gas line is provided in order to transport gas to the high voltage electrode or to the nozzle, respectively. A particularly compact construction is made possible with this.

In the case of an additional embodiment of the angle adapter according to the invention, the portion of the gas line arranged in the housing is connected to the labyrinth on the outlet side. A particularly compact construction is made possible with this as well. And when ozone or ionized air forms in the labyrinth, it can be flushed out by means of the gas, which is transported into the labyrinth.

In the case of a further development of the angle adapter according to the invention, the portion of the gas line, which is arranged in the pivot body, is connected to the labyrinth on the inlet side. A particularly compact construction is made possible with this as well. The gas line can additionally be used to flush out the labyrinth and to transport the gas to the high voltage electrode in this way.

In the case of another further development of the angle adapter according to the invention, a dielectric is provided in the labyrinth. The electrical insulation can thus be increased towards the outer side of the angle adapter.

In the case of an additional further development of the angle adapter according to the invention, the dielectric is an inert gas or high voltage grease.

In the case of the angle adapter according to the invention, it can additionally be provided that the downstream powder channel has a longitudinal axis, which runs obliquely to the pivot axis.

In the case of the angle adapter according to the invention, it can furthermore be provided that the upstream powder channel has a downstream channel section and an upstream channel section. The upstream channel section runs concentrically to the longitudinal axis, and the downstream channel section runs concentrically to the pivot axis.

In the case of a further development of the angle adapter according to the invention, a contact ring is provided at the transition from the upstream housing to the pivot body. The contact ring serves the purpose of connecting the portion of the high voltage line, which is located in the upstream housing, to the portion of the high voltage line, which is located in the pivot body.

In the case of another further development of the angle adapter according to the invention, the contact ring is arranged adjacent to the powder channel.

In the case of an additional further development of the angle adapter according to the invention, the contact ring is arranged between the powder channel and the gas line, viewed in the radial direction.

In the case of an embodiment of the angle adapter according to the invention, a seal is provided in the outer region of the transition from the housing to the pivot body, which seal seals the labyrinth in a gas-tight manner to the outside.

The angle adapter according to the invention can have a clamping nut, which is arranged at the transition from the housing to the pivot body and which is provided to fasten the pivot body to the housing.

In the case of another embodiment of the angle adapter according to the invention, the clamping nut is made of an electrically non-conductive material.

In the case of the angle adapter according to the invention, the labyrinth preferably has a width of between 0.1 mm and 0.8 mm. The width refers to the width of the gap within the labyrinth, through which gas, for example compressed air, can flow.

In the case of another embodiment of the angle adapter according to the invention, the outlet of the upstream powder channel and the inlet of the downstream powder channel are formed in such a way that they can be tightly connected to one another.

In the case of the angle adapter according to the invention, a powder mixer can be provided in the upstream region of the downstream powder channel. This has the advantage that the powder is distributed more homogenously in the powder channel.

In the case of a further development of the angle adapter according to the invention, the cross section of the powder mixer tapers first and widens again later, viewed in the flow direction.

In the case of another further development of the angle adapter according to the invention, the powder mixer has blades, in order to provide the powder, which flows through the powder channel, with a spin.

In the case of the angle adapter, the contact ring is formed in an advantageous manner as conductive O ring.

This O ring can additionally be provided in order to seal the labyrinth in the radial direction to the powder channel.

The angle adapter according to the invention can additionally have a threaded sleeve, via which the housing can be connected to a gun barrel. The threaded sleeve is formed in such a way that it provides for a rotation of the angle adapter with respect to the gun barrel in the released state.

A method is additionally proposed, in order to set the direction, in which a powder spray device, which comprises the above-described angle adapter, is to spray.

The method comprises the following steps. A clamping nut, which connects the housing and the pivot body to one another, is released. In a further step, the pivot body is pivoted into the desired pivot angle position with respect to the housing. In an additional step, the clamping nut is screwed down.

The method can additionally comprise the following steps. The threaded sleeve, which connects the housing to the gun barrel, is released. The angle adapter is then rotated into the desired position with respect to the gun barrel, and the threaded sleeve is screwed down.

BRIEF DESCRIPTION OF THE DRAWINGS

The invention will be described in more detail below by means of several exemplary embodiments on the basis of several figures.

WAYS OF CARRYING OUT THE INVENTION

Figure 1:
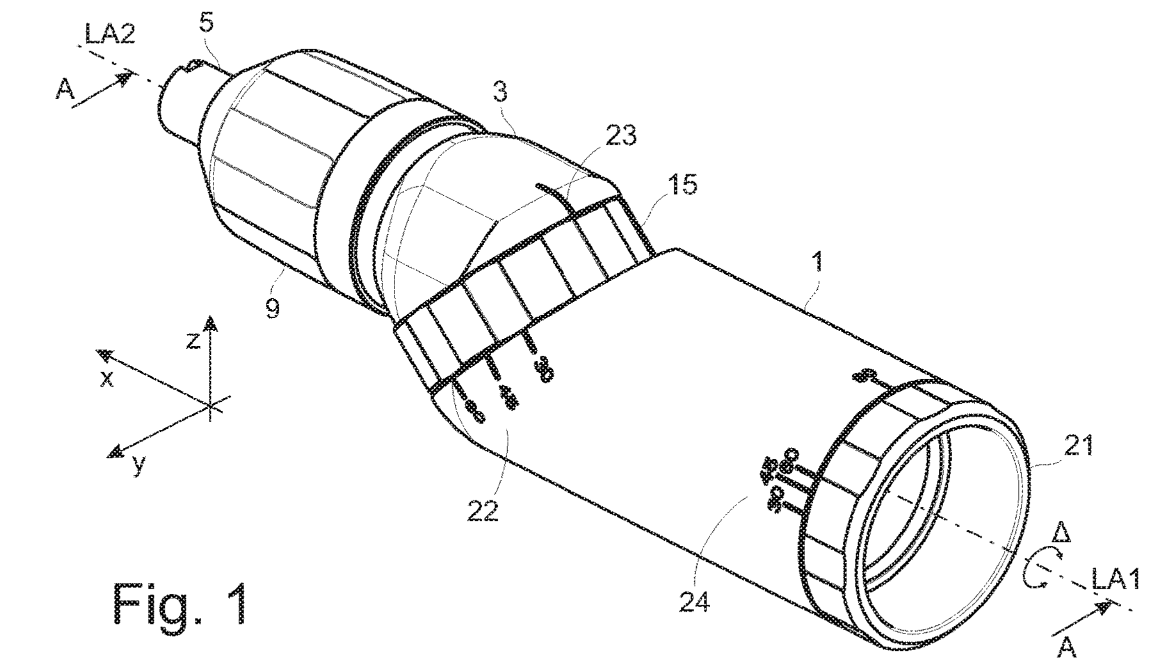
FIG. 1 shows a first possible embodiment of the angle adapter according to the invention in a first pivot position in a three-dimensional view.

A first possible embodiment of the angle adapter according to the invention is illustrated in FIGS. 1 to 10. The angle adapter comprises a housing 1, which is also referred to as upstream housing, and a pivot body 3, which, on the downstream side of the housing 1, connects to the latter.

The housing 1 has a longitudinal axis LA1, the pivot body 3 has a separate longitudinal axis LA2. The longitudinal axis LA1 will also be referred to hereinafter as first longitudinal axis, and the longitudinal axis LA2 will also be referred to as second longitudinal axis.

Reference will be made hereinafter to a rotation, when a rotatory movement about the longitudinal axis LA1 or LA2 is involved. Reference will be made to pivoting, when a rotatory movement about the pivot axis DA is involved.

A powder channel 2 is located in the interior of the housing 1. A powder channel 42 connects to the downstream end of the powder channel 2, whereby the two powder channels 2 and 42 are preferably arranged concentrically to the longitudinal axis LA1. The downstream end of the powder channel 42 is rotatably connected to a powder channel 41. The powder channel 41 is arranged concentrically to the pivot axis DA, and the latter is inclined at an angle $\alpha$ with respect to the longitudinal axis LA1. The pivot axis DA thus runs obliquely to the longitudinal axis LA1, whereby the angle $\alpha$ defines, how obliquely the pivot axis DA runs to the longitudinal axis LA1. A downstream powder channel 4 connects to the powder channel 41. The powder channel 4 is arranged in an electrode holder 35 and reaches through the latter. The powder channel 4 is preferably arranged concentrically to the second longitudinal axis LA2. The longitudinal axis LA2 is inclined at an angle $\beta$ with respect to the pivot axis DA. The longitudinal axis LA2 thus runs obliquely to the pivot axis DA, whereby the angle $\beta$ defines, how obliquely the longitudinal axis LA2 runs to the pivot axis DA. A powder nozzle 5, through which the powder P can be sprayed, connects to the powder channel 4. The nozzle 5 can likewise be arranged concentrically to the second longitudinal axis LA2.

The angle $\alpha$ can be, for example 135°. The angle $\beta$ can also be, for example, 135°. The two angles $\alpha$ and $\beta$ are preferably of the same size, so that the two longitudinal axes LA1 and LA2 run parallel to one another (see FIG. 3). When the two angles $\alpha$ and $\beta$ are each 135°, the longitudinal axis LA2 can draw an angle of 0° to maximally 90° with the longitudinal axis LA1 (see FIGS. 3 and 9).

Figure 2:
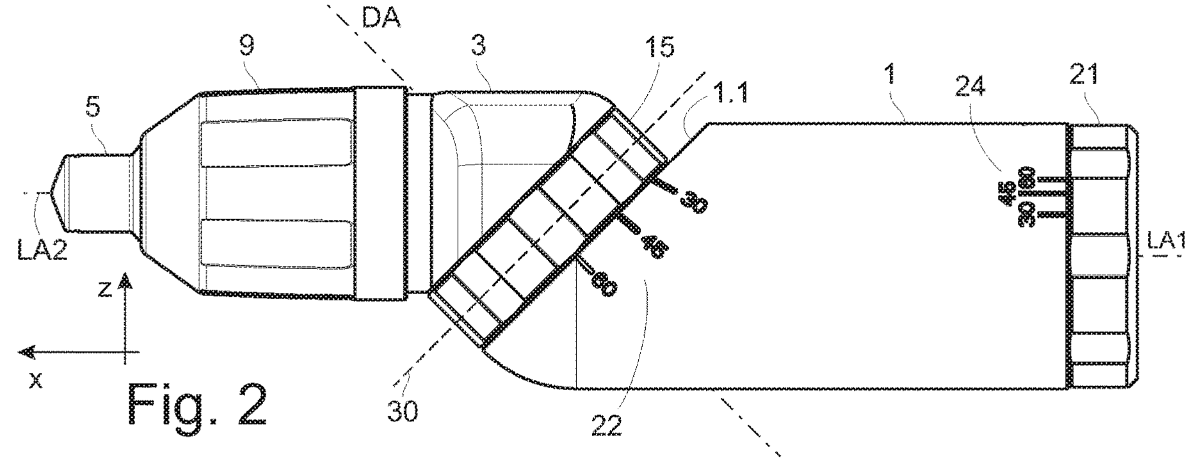
FIG. 2 shows the first embodiment of the angle adapter in the side view.
Figure 3:
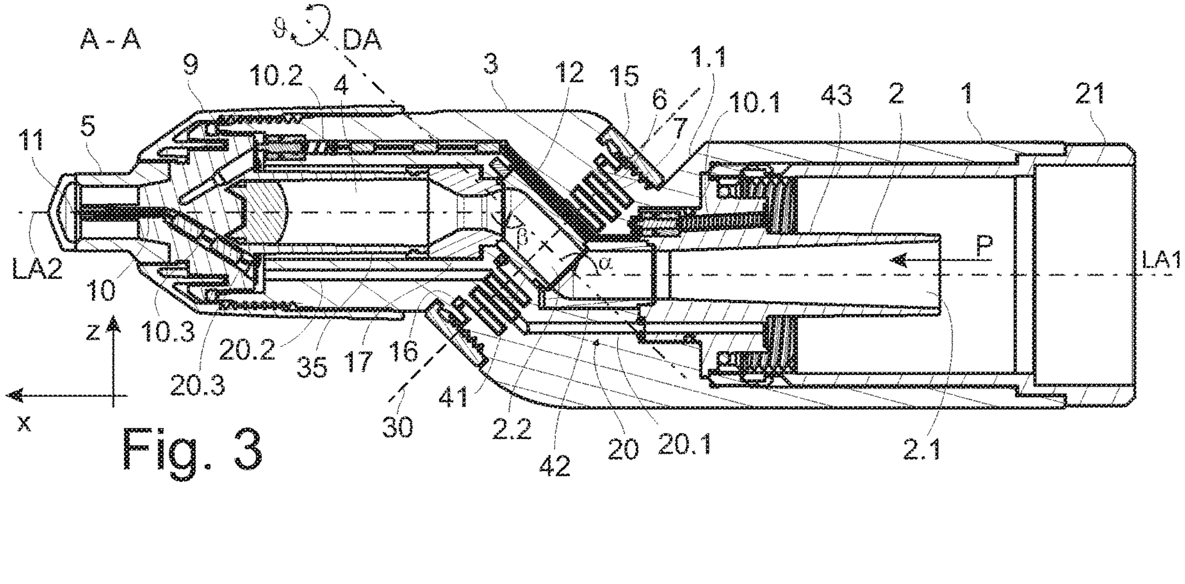
FIG. 3 shows the first embodiment of the angle adapter in the longitudinal section.

In FIGS. 1 to 3, the angle adapter is shown in a first powder spray position. In this pivot position, the first longitudinal axis LA1 and the second longitudinal axis LA2 run offset parallel to one another. In this pivot position, which is referred to as zero position, the powder spray direction is offset parallel to the first longitudinal axis LA1, so that the powder P is sprayed from the nozzle 11 offset parallel to the first longitudinal axis LA1.

Figure 4:
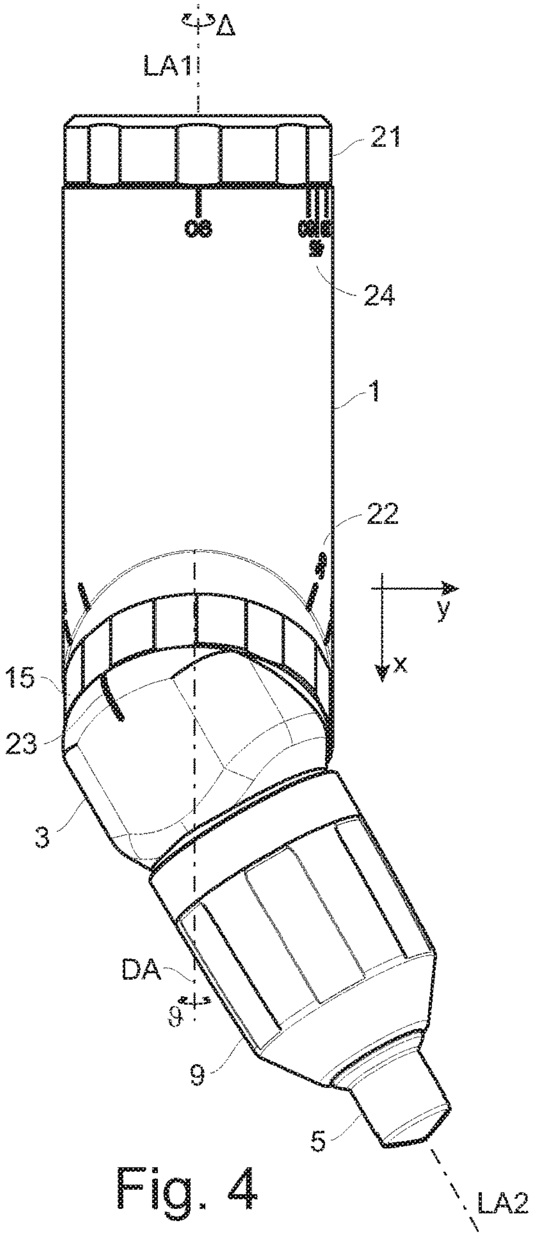
FIG. 4 shows the first embodiment of the angle adapter in a second pivot position in a three-dimensional view.

In FIG. 4, the angle adapter is illustrated in a second powder spray position. In this position, the pivot body 3 is pivoted counter-clockwise at a pivot angle $\vartheta$=30° with respect to the housing 1. The powder P now flows out of the nozzle 5 at an angle of $\vartheta$=30°, based on the longitudinal axis LA1.

Figure 5:
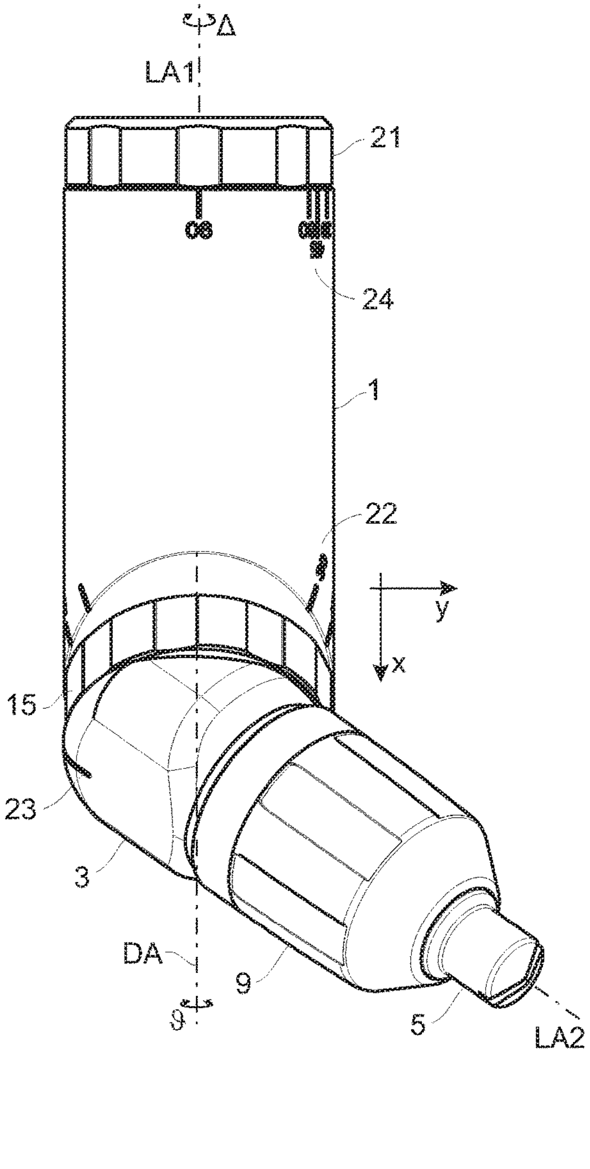
FIG. 5 shows the first embodiment of the angle adapter in a third pivot position in a three-dimensional view.

In FIG. 5, the angle adapter is shown in a third powder spray position. In this position, the pivot body 3 is pivoted counter-clockwise about the pivot angle $\vartheta$=60° with respect to the housing 1 or the longitudinal axis LA1, respectively. The size of the set pivot angle $\vartheta$ can be read by means of a scale 22, which is specified on the housing 1, in combination with a mark 23, which is attached to the pivot body 3.

Figure 7:
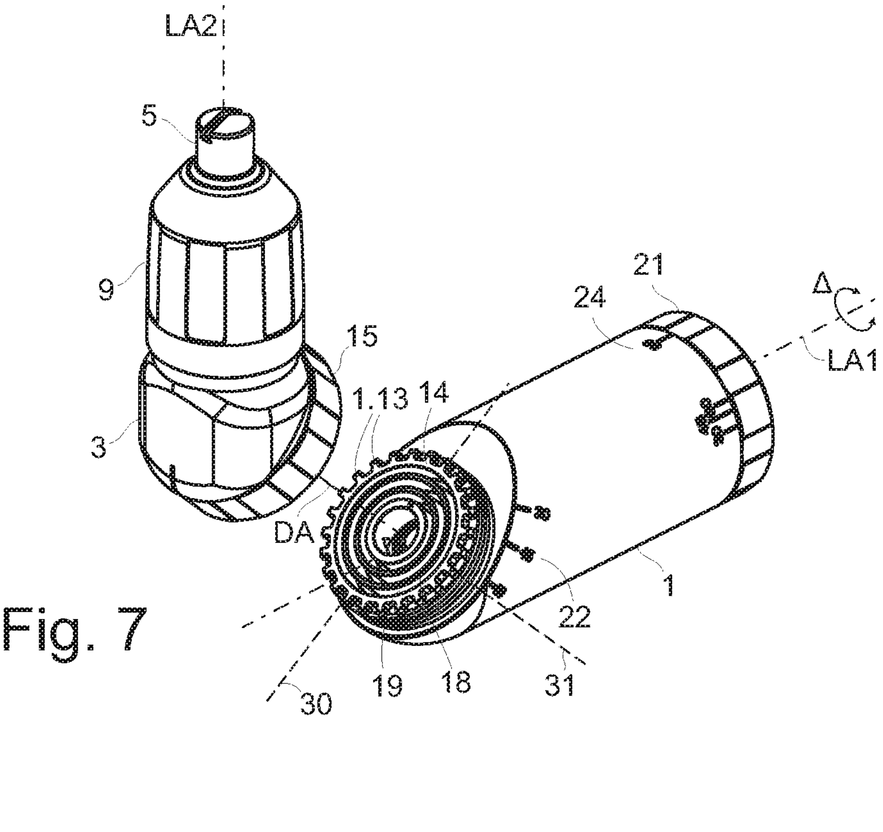
FIG. 7 shows the first embodiment of the angle adapter in the fourth pivot position in a partial exploded view.

At the location where the pivot body 3 is in contact with the housing 1, said pivot body has several webs 6 and grooves 7. At the location where the housing 1 is in contact with the pivot body 3, said housing also has grooves 19 and webs 18. This region forms the transition between housing 1 and pivot body 3. The grooves 19 and webs 18 of the housing 1, and the webs 6 and grooves 7 of the pivot body 3 are formed and arranged so that a respective web 6 of the pivot body 3 protrudes into a groove 19 of the housing 1, and a respective web 18 of the housing 1 protrudes into a groove 7 of the pivot body 3. In this way, the webs 6, 18 and grooves 7, 19 form a joint, by means of which the pivot body 3 can be pivoted with respect to the housing 1. The surface 14 at the housing 1 forms a bearing surface, on which the pivot body 3 bears in a movable manner (FIG. 7). The two straight lines 30 and 31 are selected so that they lie in the bearing surface 14. They span the pivot plane. The pivot axis DA is perpendicular to the pivot plane.

Figure 8:
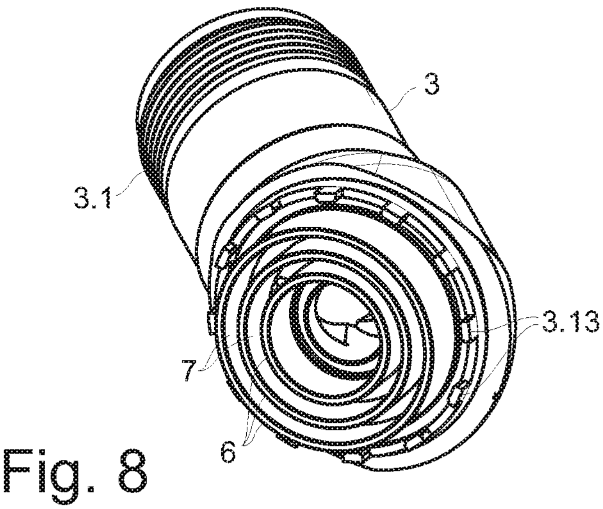
FIG. 8 shows the pivot body of the angle adapter in a three-dimensional view.

The intersection, which is part of the joint at the housing 1, can have one or several locking lugs 1.13 (for example on the outer side) (see FIGS. 7 and 8). The pivot body 3 can also have one or several locking lugs 3.13 in the region of the intersection. The pivot angle $\vartheta$ can thus be changed in angle steps, which are specified by the locking lugs 1.13 and 3.13. When the locking lugs 1.13 and 3.13 engage with one another, it is additionally prevented that the pivot body 3 is inadvertently pivoted with respect to the housing 1. The O ring 39, which establishes the electrical contact between the two high voltage lines 10.1 and 10.2, is thus also protected. Otherwise, the wire end of the high voltage line 10.1 or the wire end 12 of the high voltage line 10.2 could damage the O ring 39. Due to the locking, it is prevented that the possibly sharp wire end 12 is pulled over the O ring 39.

A clamping nut 15 is located at the joint. When the clamping nut 15 is released, the pivot body 3 can be pivoted with respect to the housing 1. When the clamping nut 15 is tightened, in contrast, the pivot body 3 and the housing 1 are rigidly connected to one another. It can be prevented in this way that the pivot body 3 is inadvertently pivoted with respect to the housing 1. The clamping nut 15 additionally ensures that the pivot body 3 cannot fall off the housing 1. The clamping nut 15 furthermore lengthens the distance for the high voltage. This means that the high voltage, which is conducted on the high voltage line 10 in the interior of the angle adapter, has to cover a larger distance, until it reaches the outer side of the angle adapter.

The creepage distance and thus the insulation resistance is enlarged thereby and the operational safety is increased.

In one embodiments, the webs 6, 18 and grooves 7, 19 are formed so that the webs 6, 18 protrude into the grooves 7, 19 without touching the grooves 7, 19 thereby. The intermediate space between the webs 6 and the grooves 19 or the webs 18 and the grooves 7, respectively, forms a labyrinth 8. The labyrinth 8 is provided to increase the distance between the high voltage line 10 and the outer side of the angle adapter. The danger of an electrical discharge is thus reduced. The intermediate space or the labyrinth, respectively, can be filled with a dielectric. An electrically slightly conductive or non-conductive substance is referred to as dielectric here, in which the available charge carriers cannot move freely. The dielectric can be an inert gas or high voltage grease and has the purpose of increasing the electrical insulation between the high voltage-conducting high voltage electrode 10 and the outer side of the powder spray device.

The O ring 39 can be formed as electrically conductive ring and can form the electrical contact point between the housing 1 and the pivot body 3 for the high voltage. It is ensured therewith that the high voltage line 10.2 in the pivot body 3 and the high voltage line 10.1 in the housing 1 are always connected to one another, namely independently of how the pivot body 3 is pivoted with respect to the housing 1. The O ring 39 can additionally be provided in order to seal the labyrinth 8 inwards in the radial direction, towards the powder channel 2. The O ring 16 serves the purpose of sealing the labyrinth 8 to the outside in the radial direction.

When the labyrinth 8 is not a gas-tight space but is to be flown through by a fluid, ordinary air, for example, which is under pressure (compressed air), can be used instead of the dielectric.

When, in the contrast, the labyrinth 8 is formed as gas-tight space, it is advantageous to use a dielectric, such as, for example, SF6 or another inert gas, such as, for example, nitrogen. In order to create the gas-tight space, the labyrinth 8 can in each case be sealed by means of a seal, for example by means of O rings 16 and 39 (FIG. 9) on its radial inner end and on its radial outer end. The atomized air is not conducted through the labyrinth 8 in this case, but via a separate line (not shown in the figures). The atomized air is provided in order to atomize the powder in the region of the nozzle mouth. The atomized air and/or the flushing air for the electrode 11 can be transported via the gas line 20.

The labyrinth 8 can also be filled with a high voltage grease, such as, for example, Vaseline or caster oil. It is not important in this case, whether the labyrinth 8 is formed as gas-tight or as non-gas-tight space. The labyrinth 8, however, is preferably formed so that the high voltage grease cannot readily escape. In the case of this embodiment, the O ring 16 can be omitted.

The angle adapter preferably has a gas line 20, via which gas is conducted to the high voltage electrode 11. The gas can be, for example, compressed air or nitrogen. An (upstream) section 20.1 of the gas line 20 runs through the housing 1 and leads to the labyrinth 8. A further (downstream) section 20.2 of the gas line 20 begins at the labyrinth 8 and extends through the pivot body 3 all the way to the electrode holder 35. A third section 20.3 of the gas line 20 is provided in the electrode holder 35, whereby the outlet of said third section is also the outlet of the high voltage electrode 11. The high voltage electrode 11 is flushed with gas with the help of the gas, which flows through the gas line 20. The gas serves as flushing air in this case.

The gas can also serve as atomized air when this involves influencing the powder cloud.

The outlet for the gas and the high voltage electrode 11 is preferably located in the mouth region of the powder spray nozzle 5 and best still within the powder spray nozzle 5 (see FIG. 3). It can also be provided, however, that the outlet is arranged even further downstream or is even located slightly outside of the mouth of the powder spray nozzle 5. When the electrode 11 is arranged within the powder spray nozzle 5, this has the advantage that the powder can be charged better because the powder, which flows out, is located closer to the electrode 11. When the gas serves as flushing air and escapes close to the electrode 11, the electrode 11 is flushed better, and it is prevented more easily that powder adheres to the electrode 11. When the gas escapes outside of the powder spray nozzle 5, e.g. in the protection plate 51 (see FIGS. 11 and 12), this has the advantage that the size of the powder cloud can be set with the gas quantity (e.g. the atomized air). Here, the gas also protects the electrode 11 against powder deposits. The powder cloud is a powder-gas mixture, which is formed essentially conically. The axis of the spray cone defines the powder spray direction. The angle of the spray cone depends, inter alia, on the mouth width of the powder nozzle 5 and on the quantity of the metering and conveying air. In the case of a flat jet nozzle, which typically has a slit-shaped mouth, the spray cone is flatter and wider than in the case of a round jet nozzle, which typically has a round mouth, or than in the case of a nozzle comprising a protection plate, due to the slit-shaped nozzle mouth. In the case of the straight flat jet nozzle (FIG. 1-10), the spray direction runs parallel to the longitudinal axis LA2. In the case of an angled flat jet nozzle, or angle nozzle in short (see FIGS. 19-32), the spray direction runs at an angle $\gamma$ to the longitudinal axis LA2. In the case of the embodiment according to FIGS. 19-22, the angle $\gamma$ is 30°, in the case of the embodiment according to FIGS. 28 to 30 it is 45°, and in the case of the embodiment according to FIGS. 23 to 27 it is 60°. The powder spray direction can thus be changed by a further angle, and the powder spray direction can be adapted even better to the workpiece geometry.

The high voltage line 10 comprises several sections 10.1, 10.2, and 10.3, and, similarly to the gas line 20, leads through the housing 1, the pivot body 3, and the electrode holder 35. The section 10.1 runs through the housing 1, the section 10.2 runs through the pivot body 3, and the section 10.3 runs through the electrode holder 35.

So that the high voltage can reach from the pivot body 3 into the electrode holder 35, a contact pin is provided at the end of the section 10.2 and a contact ring is provided at the electrode holder 35. The electrical connection is thus always ensured, namely independently of the orientation of the electrode holder 35 with respect to the pivot body 3. The electrode holder 35 can thus be inserted into the pivot body 3 and can be fixed to the pivot body 3 in any rotational position with the help of a cap nut 9. The rotational position is based on the longitudinal axis LA2, which forms the axis of rotation in this case, about which the electrode holder can be rotated.

In an advantageous manner, the cap nut 9 has an internal thread, and the pivot body 3 has a corresponding external thread. The cap nut 9 and the pivot body 3 can be connected to one another via these two threads. When the cap nut 9 is unscrewed from the pivot body 3, the electrode holder 35 can be pulled out of the pivot body 3.

The powder spray nozzle 5 can be attached to the electrode holder 35 and can have a ledge 5.3. The powder spray nozzle 5 can be held in the position by means of the cap nut 9, which forms a positive connection with the ledge 5.3.

The powder spray nozzle 5 according to FIGS. 1 to 10 is formed as flat jet nozzle. It creates a flat, wide powder jet.

When the labyrinth 8 is formed as closed, that is, as an essentially tight space, it can be provided that the air channel 20, via which compressed air is conducted to the high voltage electrode 11, does not run through the labyrinth 8, but runs outside of the labyrinth 8 (not shown in the figures).

Figure 9:
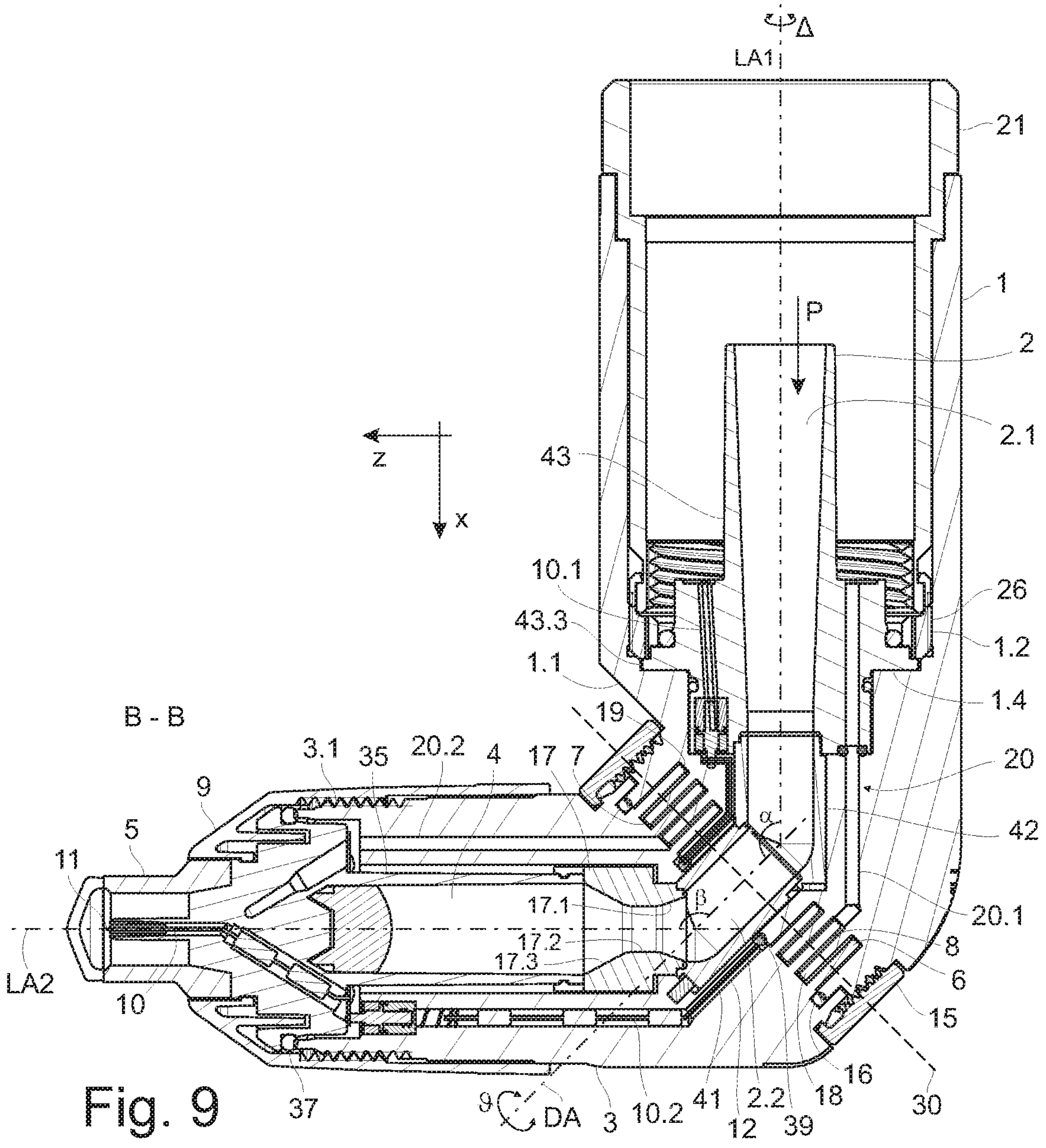
FIG. 9 shows the first embodiment of the angle adapter in the fourth pivot position in the longitudinal section.

In the case of an embodiment of the angle adapter, the portion of the gas line 20.2, which is arranged in the pivot body 3, is arranged further inwards on the inlet side than the outlet of the portion of the gas line 20.1, which is arranged in the housing 1—viewed in the radial direction (see FIG. 9).

In order to set the powder spray direction, the procedure is generally as follows. First of all, the clamping nut 15, which connects the housing 1 and the pivot body 3, is released. Then, the housing 1 and the pivot body 3 are pulled apart in the axial direction (based on the pivot axis DA). 1 to 10 mm are generally sufficient for this purpose. Depending on how the intersection between the housing 1 and the pivot body 3 is formed, 2 to 5 mm are also sufficient already. The pivot body 3 can now be pivoted into the desired angular position with respect to the housing 1. The housing 1 and the pivot body 3 are subsequently pushed together again, and the clamping nut is screwed down.

Figure 6:
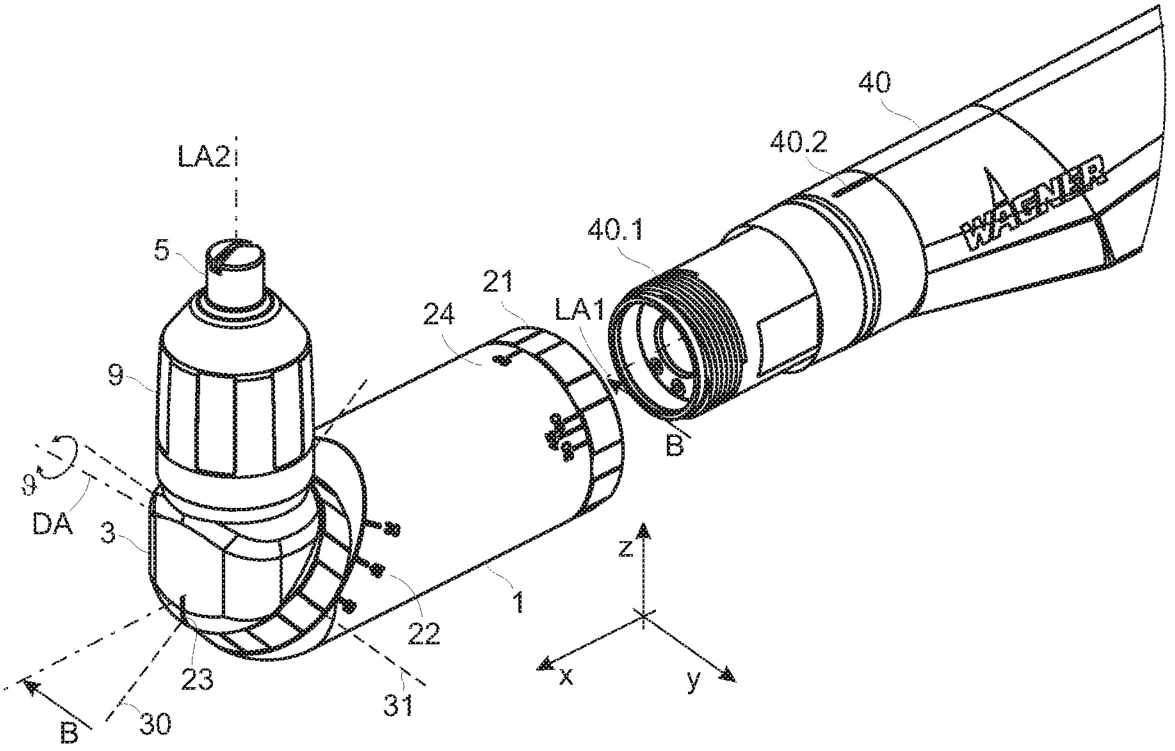
FIG. 6 shows the first embodiment of the angle adapter and a portion of the gun barrel of a powder spray device in a fourth pivot position in a three-dimensional view.

In order to fasten the angle adapter to the gun barrel 40 of a spray applicator, a threaded sleeve 21 can be provided, which is screwed to a corresponding thread 40.1 of the gun barrel 40 (see FIG. 6).

In a further embodiment, it is provided that not only the pivot body 3 can be pivoted about the pivot axis DA, but the entire angle adapter can be rotated about the longitudinal axis LA1. To make this possible, the threaded sleeve 21 is released first, by means of which the angle adapter is fastened to the gun barrel 40.1 of the spray applicator 40. The angle adapter can subsequently be rotated about the longitudinal axis LA1 into the desired rotational position. To be able to easily set the angle of rotation A, an angle scale 24 can be attached to the housing 1 of the angle adapter, and a corresponding reference mark 40.2 can be attached to the gun barrel 40. After the angle adapter has the desired rotational position, the clamping nut 21 is screwed firmly to the gun barrel 40 again, so that the angle adapter is now fixed in its new position.

The powder channel 2 can have a taper, which is preferably located upstream of the joint (FIG. 3). On the downstream side of the joint, the powder channel 4 can have a widening again. The upstream powder channel 2.1 thus tapers in the flow direction, and the downstream powder channel 4 widens downstream from the joint. The powder stream can thus be homogenized again downstream from the joint.

Additionally or alternatively, a powder mixer 17 can be provided in the powder channel 2 downstream from the powder channel 41, viewed downstream. The powder mixer 17 is provided to homogenize the powder stream. The powder, which flows through the angled section of the powder channel 4, is to thus be centered and directed again (based on the longitudinal axis LA2). After the powder-air mixture has passed the taper, it is widened again and is thus distributed evenly over the cross section of the powder channel 4. To attain this, the powder mixer 17 has a taper 17.1 in the channel cross section on the inlet side. A section with constant cross section 17.2 connects to this tapering section 17.1, and a widening section 17.3, in turn, connects to said tapering section.

Figure 16A:
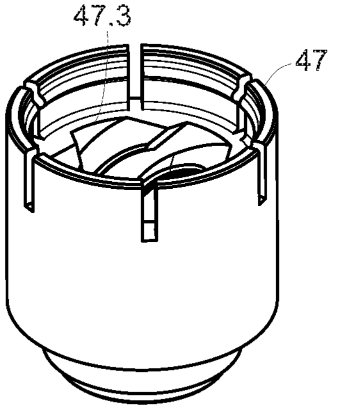
FIG. 16*a* shows a possible embodiment of a mixer in a three-dimensional view.
Figure 16B:
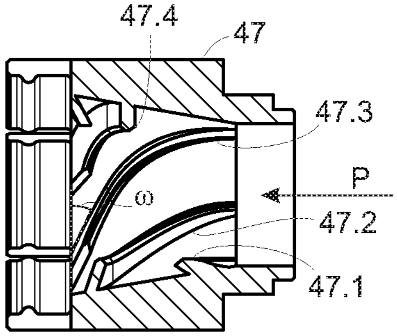
FIG. 16*b* shows the mixer in the longitudinal section.

In a further embodiment of the angle adapter, a powder mixer 47, which has one or several lamellae or blades in order to provide the powder flowing through the powder channel with a spin, can also be provided instead of the powder mixer 17. In the case of the embodiment shown in FIGS. 16*a* and 16*b*, the powder mixer 47, which is also referred to as mixer in short, has four blades 47.1, 47.2, 47.3, and 47.4. The blades 47.1, 47.2, 47.3, and 47.4 are formed so that they draw an angle $\omega=30°$ with the vertical on the outlet side of the mixer 47. In FIG. 16*b*, the flow direction of the powder P is suggested by means of an arrow.

Figure 17A:
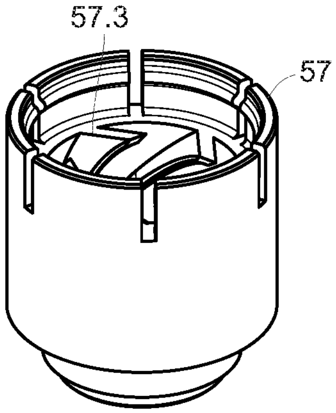
FIG. 17*a* shows a further embodiment of the mixer in a three-dimensional view.
Figure 17B:
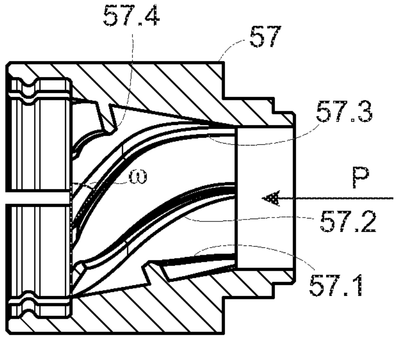
FIG. 17*b* shows the further embodiment of the mixer in the longitudinal section.
Figure 18A:
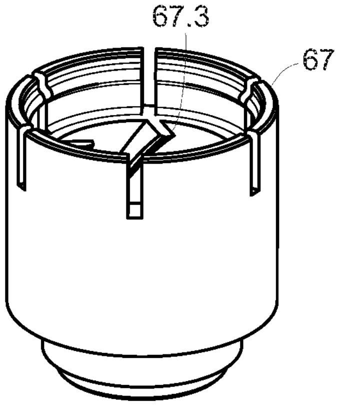
FIG. 18*a* shows an additional embodiment of the mixer in a three-dimensional view.
Figure 18B:
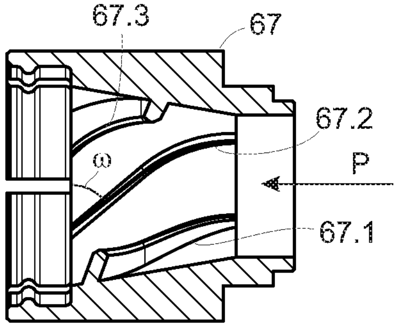
FIG. 18*b* shows the additional embodiment of the mixer in a three-dimensional view.
Figure 19:
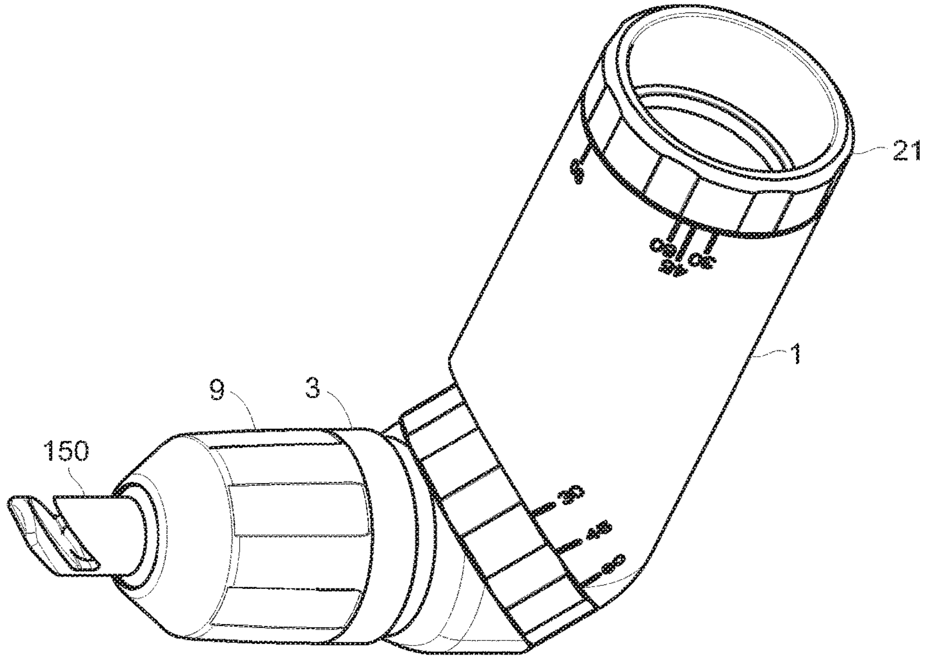
FIG. 19 shows a third embodiment of the angle adapter in a three-dimensional view.
Figure 20:
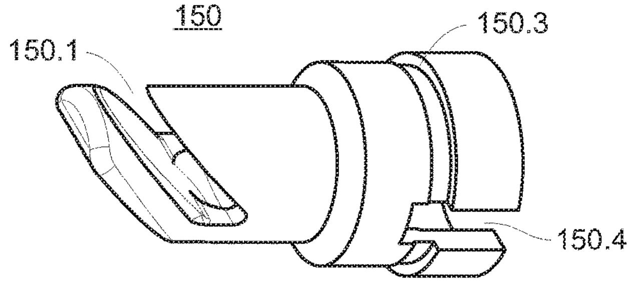
FIG. 20 shows a further embodiment of the nozzle in a three-dimensional view.
Figure 21:
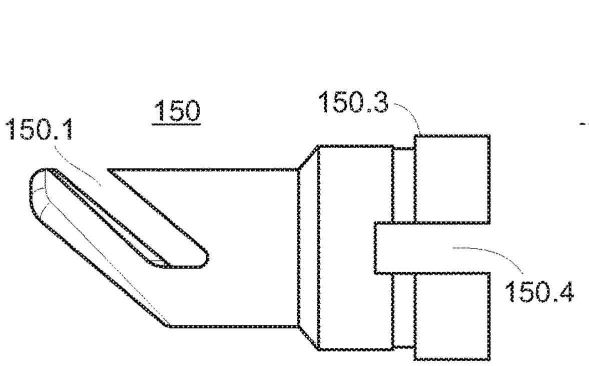
FIG. 21 shows the further embodiment of the nozzle in the side view.
Figure 22:
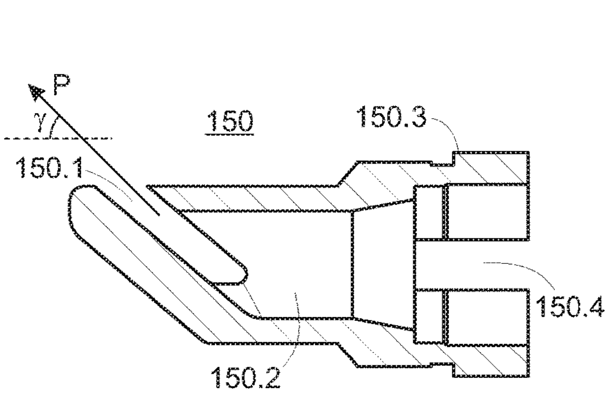
FIG. 22 shows the further embodiment of the nozzle in the longitudinal section.
Figure 23:
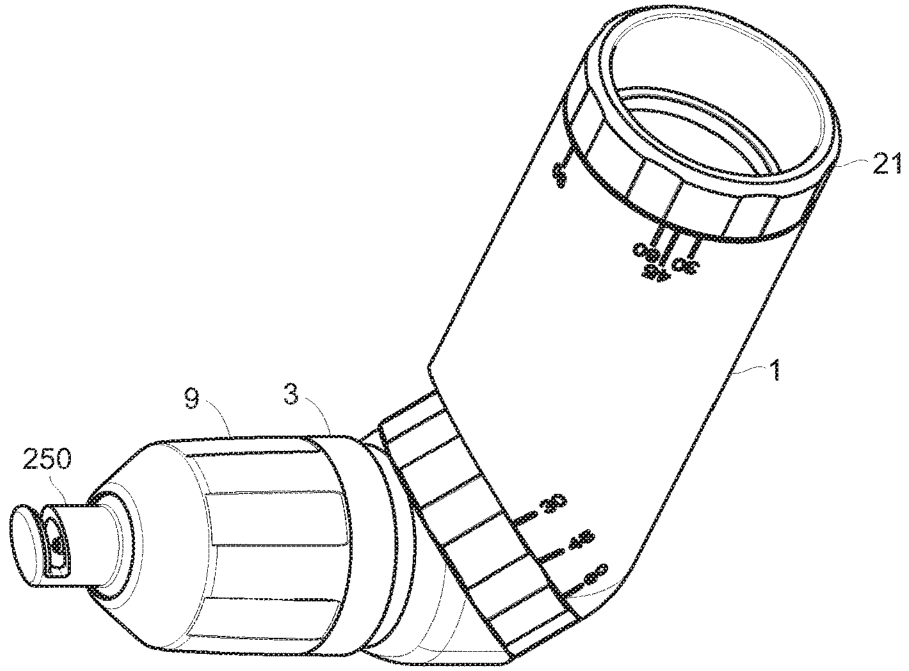
FIG. 23 shows a fourth embodiment of the angle adapter in a three-dimensional view.
Figure 24:
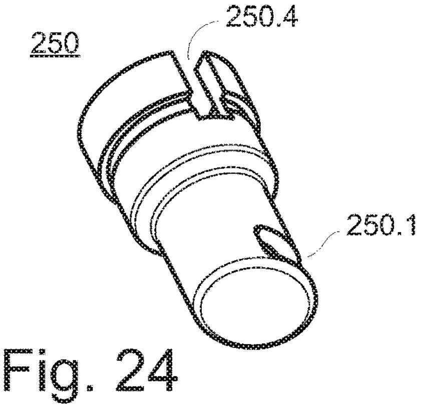
FIG. 24 shows a fourth embodiment of the nozzle in a three-dimensional view.
Figure 25:
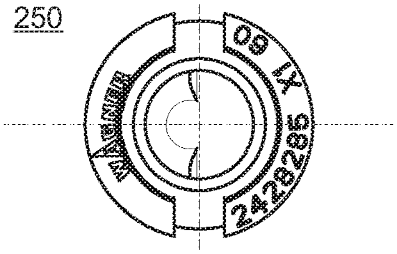
FIG. 25 shows the fourth embodiment of the nozzle in the view from the front.
Figure 26:
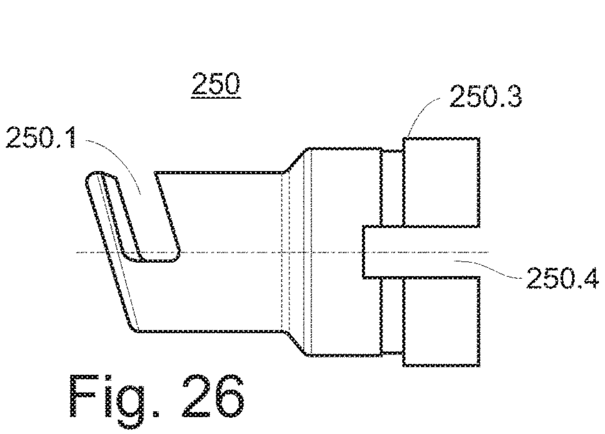
FIG. 26 shows the fourth embodiment of the nozzle in the side view.
Figure 27:
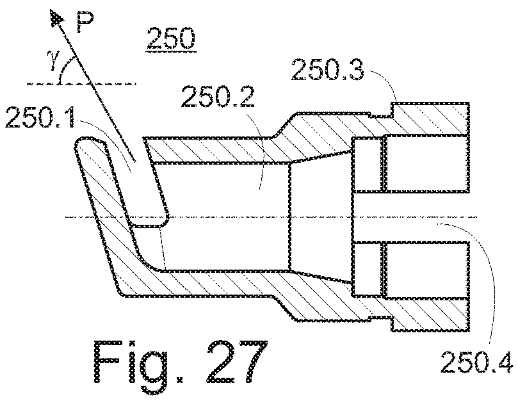
FIG. 27 shows the fourth embodiment of the nozzle in the longitudinal section.

Alternatively, the angle adapter can also have a powder mixer 57 or a powder mixer 67. In the case of the powder mixer 57 according to FIGS. 17*a* and 17*b*, the angle $\omega=40°$. In the case of the powder mixer 67 according to FIGS. 18*a* and 18*b*, the angle $\omega=50°$. The angle ω influences the cleanability. The larger the angle ω, the easier the mixer can be cleaned. However, the angle ω also influences the spin, which is to be provided to the powder. The smaller the angle ω, the stronger the spin, which is provided to the powder.

The powder is swirled in the interior of the mixer with the help of the blades and escapes as homogenous, directed powder stream at the outlet of the mixer.

The upstream powder channel 2 is preferably arranged in a sleeve 43. The sleeve 43 comprising the upstream powder channel 2 is inserted in the housing 1 and is preferably clamped firmly in the housing 1 by means of a securing sleeve 26 (FIG. 9). For this purpose, the securing sleeve 26 has an external thread 26.1, via which it is screwed to an internal thread 1.2 provided in the housing 1. When the securing sleeve 26 is screwed into the housing 1, the downstream end of the securing sleeve 26 pushes on a correspondingly formed shoulder 43.3 of the sleeve 43, which is located on the outer side of the sleeve 43.

Figure 13:
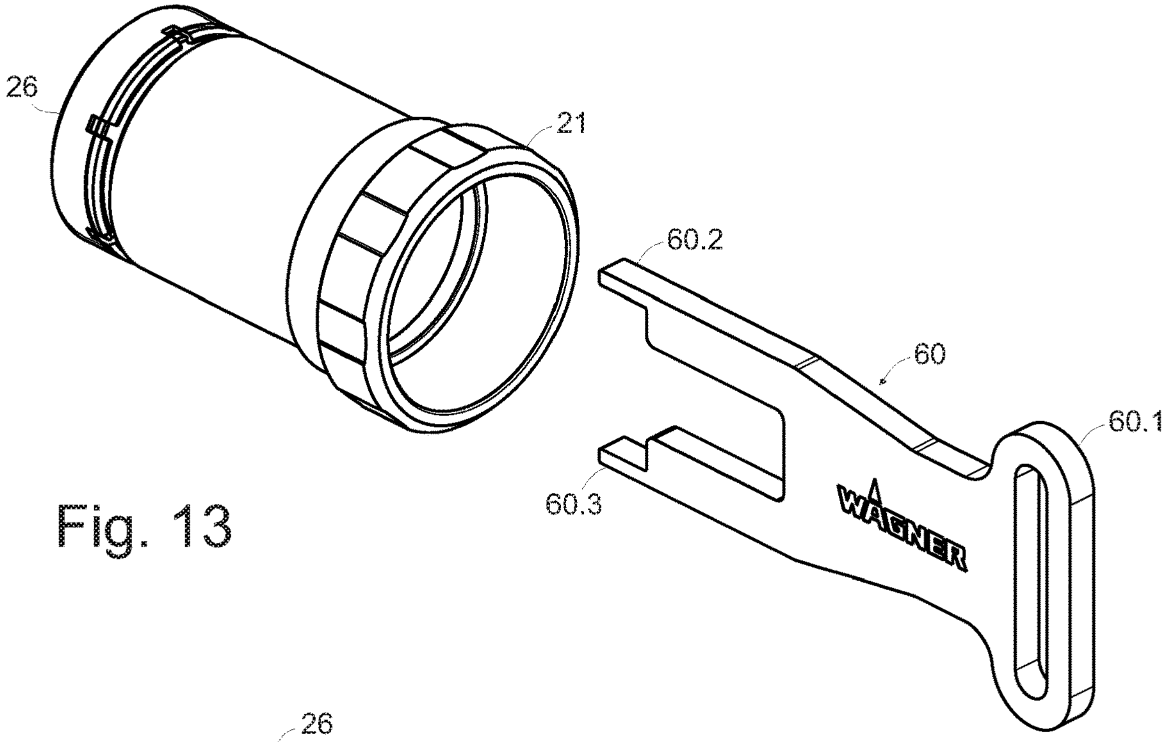
FIG. 13 shows a screw-in sleeve, which comprises a threaded sleeve and a securing sleeve, whereby the screw-in sleeve can be part of the angle adapter, and a mounting tool for the screw-in sleeve in a three-dimensional view.
Figure 14:
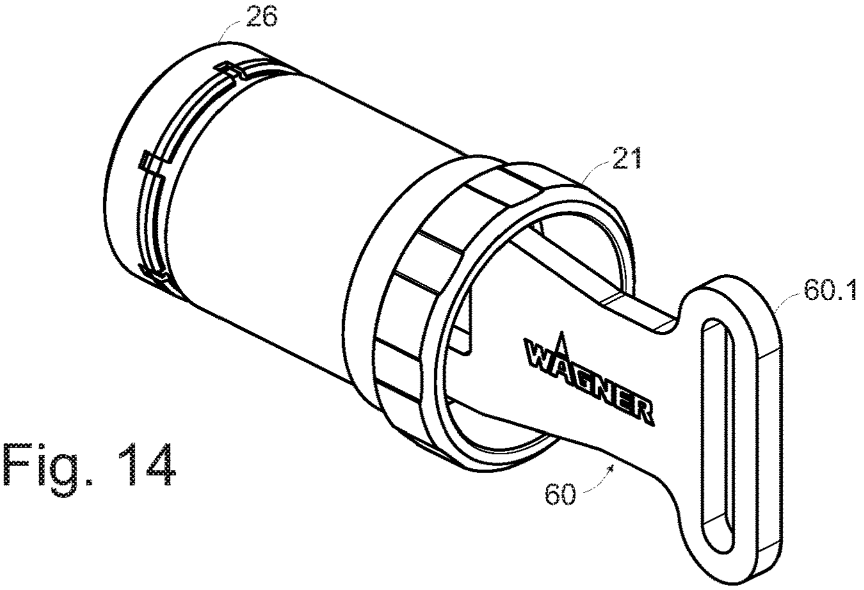
FIG. 14 shows the screw-in sleeve and the mounting tool, which is inserted into the screw-in sleeve, in a three-dimensional view.
Figure 15:
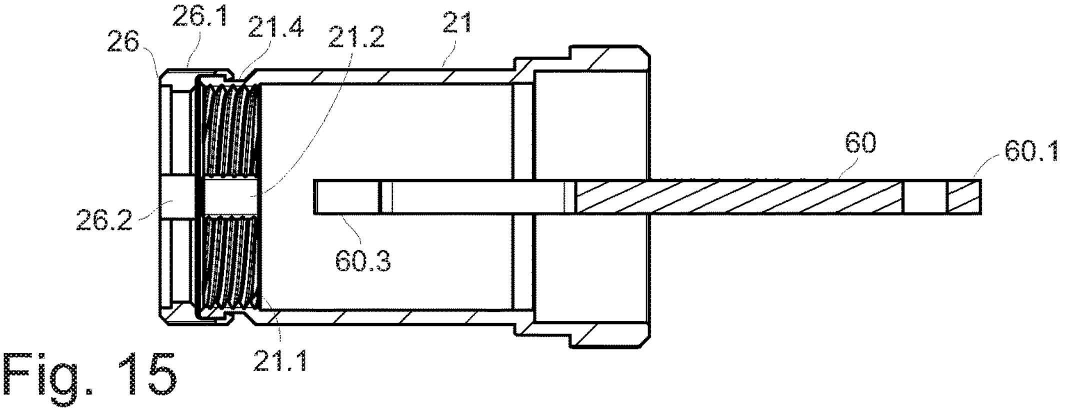
FIG. 15 shows the screw-in sleeve and the mounting tool, which is partially inserted into the screw-in sleeve, in the longitudinal section.

The securing sleeve 26 is additionally connected to a threaded sleeve 21 via a snap connection (FIGS. 13 to 15). For this purpose, the securing sleeve 21 has on its upstream side an annular snap hook, which—in the mounted state—engages with an annular groove 21.4 of the threaded sleeve 21, which is located at the downstream end of the threaded sleeve 21. The snap connection is formed so that the threaded sleeve 26 can be rotated freely about the longitudinal axis LA1 with respect to the securing sleeve 21.

On the inner side, the downstream end of the threaded sleeve 21 has an internal thread 21.1 and two grooves 21.2. The webs 60.2 and 60.3 of a mounting tool 60 can be inserted into the grooves 21.2, when the mounting tool 60 is aligned accordingly. So that the mounting tool can be grasped easily, it is equipped with a handle 60.1.

To remove the sleeve 43 comprising the upstream powder channel 2 from the housing 1, the mounting tool 60 is inserted into the threaded sleeve 21 and is rotated until the webs 60.2 and 60.3 protrude into the grooves 21.2 provided for this purpose and form a positive connection with them. Together with the threaded sleeve 21, the mounting tool 60 is now rotated until the two webs 60.2 and 60.3 also engage with the grooves 26.2 of the securing ring 26 and form a positive connection with the latter as well. In FIG. 15, the groove 26.2, the groove 21.2, and the web 60.3 of the mounting tool 60 are aligned so that the web 60.3 can be inserted into the two grooves 21.2 and 26.2. As soon as the positive connection between the mounting tool 60 and the grooves 21.2 and 26.2 is established, the mounting tool 60 can be rotated, and the securing sleeve 26 can be unscrewed from the housing 1 to the back together with the threaded sleeve 21. The external thread 26.1 of the securing sleeve 26 is thereby unscrewed from the internal thread 1.2 in the housing 1.

The internal thread 21.1 of the threaded sleeve 21 is provided for being screwed to the external thread 40.1 of the gun barrel 40. As soon as the threaded sleeve 21 is screwed firmly to the gun barrel 40, the angle adapter can no longer be rotated about the longitudinal axis LA1.

To mount the upstream powder channel 2, the sleeve 43 is inserted into the housing 1 from the upstream side. The securing sleeve 26 and the threaded sleeve 21 are subsequently inserted into the housing 1. The securing sleeve 26 is now screwed to the housing 1 with the help of the mounting tool 60.

Figure 11:
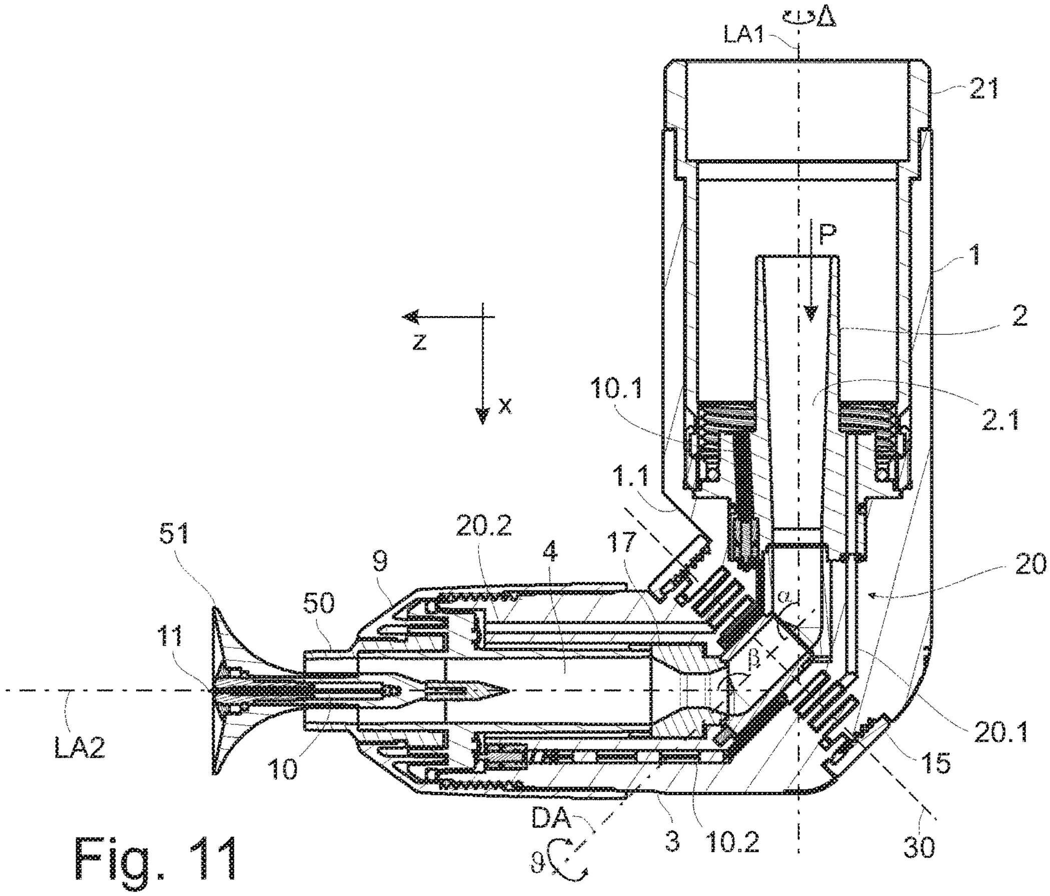
FIG. 11 shows a second embodiment of the angle adapter in the longitudinal section.
Figure 12:
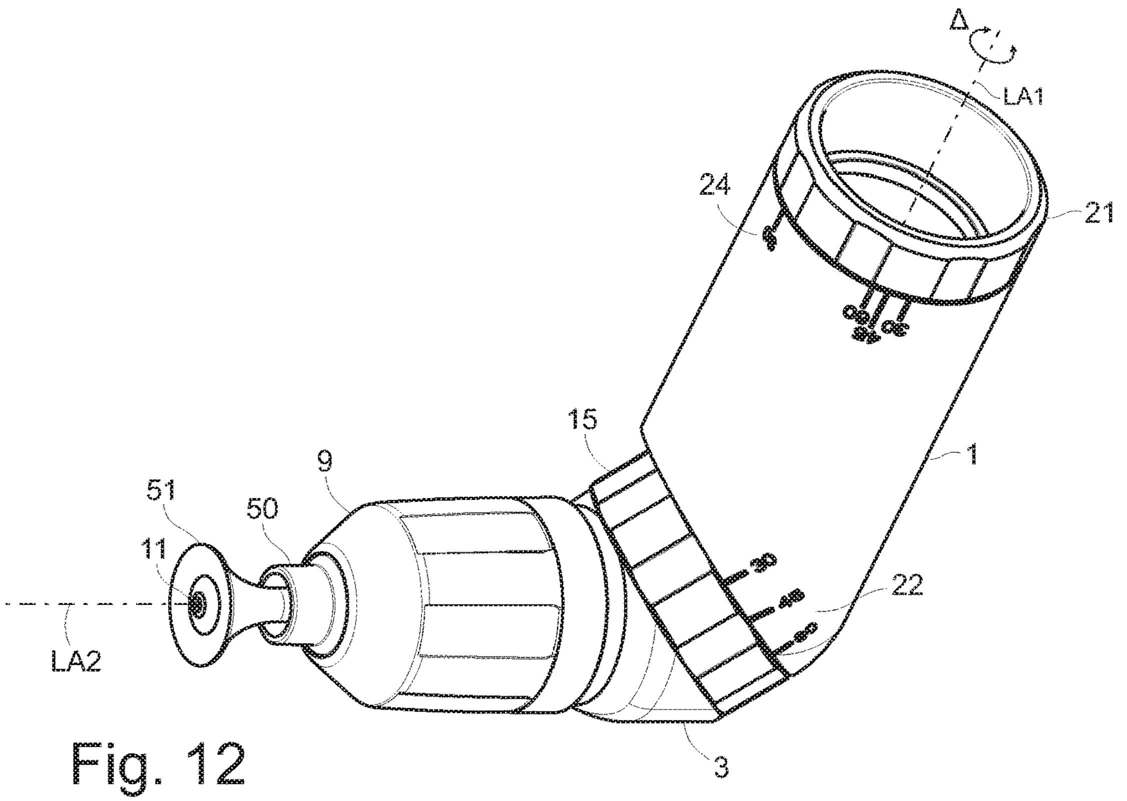
FIG. 12 shows the second embodiment of the angle adapter in a three-dimensional view.

A second embodiment of the angle adapter according to the invention is illustrated in FIGS. 11 and 12. The second embodiment differs from the first embodiment essentially in the mouth region. Instead of the nozzle 5, a nozzle 50 is installed here, which is formed so that it can receive a protection plate 51. A round, conical powder spray jet can thus be created. The high voltage line 10 leads through the nozzle 50 and the protection plate 51 and ends as high voltage electrode 11 on the downstream side of the protection plate 51.

A third embodiment of the angle adapter is illustrated in FIGS. 19 to 22. The third embodiment differs from the other embodiments in the mouth region. Instead of the nozzle 5 or 50, respectively, a nozzle 150 is installed here, which is formed so that it sprays the powder at an oblique angle γ of around 30°. The nozzle slit 150.1 extends over the entire width of the powder channel 150.2.

Figure 10:
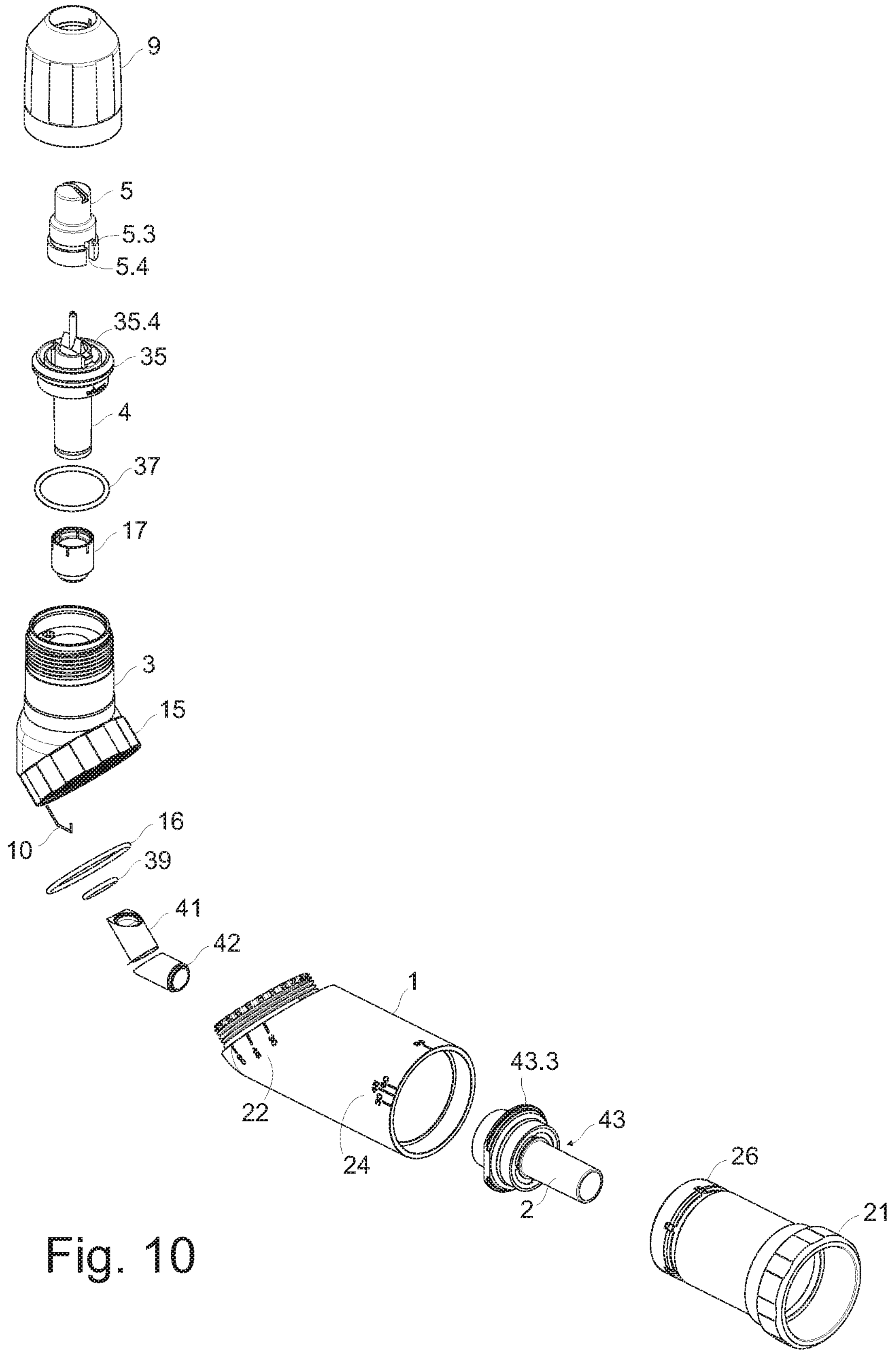
FIG. 10 shows the first embodiment of the angle adapter in an exploded view.

The nozzle 150 can be aligned at the electrode holder 35 with the help of a groove 150.4 and a correspondingly formed web 35.4 at the electrode holder 35 (FIG. 10). In the assembled state, the web 35.4 and the groove 150.4 form a positive connection, so that the nozzle 150 cannot inadvertently rotate based on the longitudinal axis LA2. This also applies analogously for the other nozzles.

Instead, the angle adapter can also be equipped with a nozzle 250. The angle adapter is illustrated with the nozzle 250 in FIGS. 23 to 27. The nozzle 250 is formed so that it sprays the powder at an oblique angle of around γ=60°.

Figure 28:
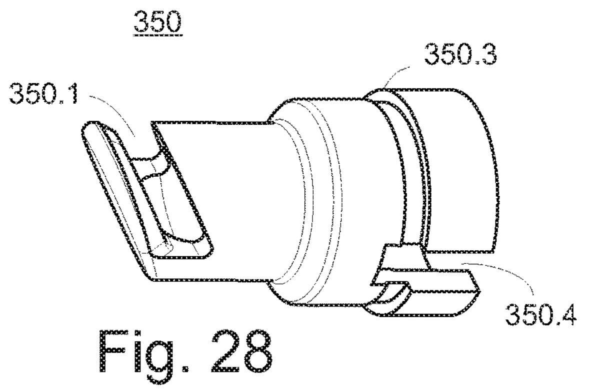
FIG. 28 shows a fifth embodiment of the nozzle in a three-dimensional view.
Figure 29:
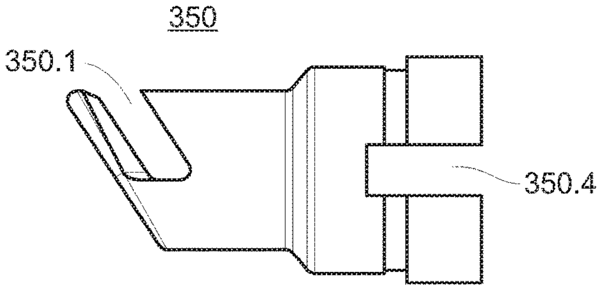
FIG. 29 shows the fifth embodiment of the nozzle in the side view.
Figure 30:
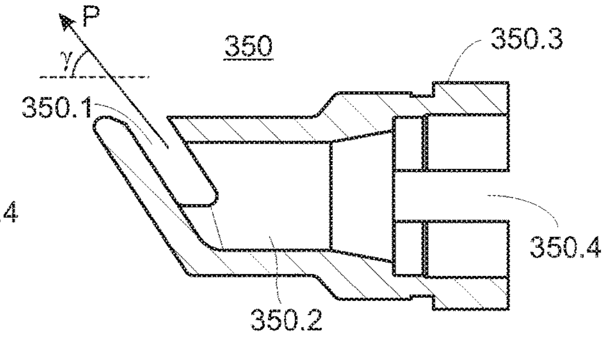
FIG. 30 shows the fourth embodiment of the nozzle in the longitudinal section.

Alternatively, the angle adapter can also be equipped with a nozzle 350. The nozzle 350 is illustrated in FIGS. 28, 29, and 30. The nozzle 350 is formed so that it sprays the powder at an oblique angle of around γ=45°. The nozzle slit 350.1 extends over the entire width of the powder channel 350.2.

Figure 31:
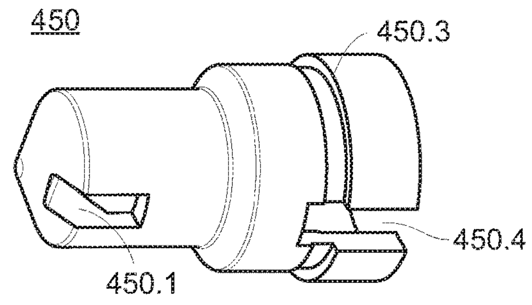
FIG. 31 shows a sixth embodiment of the nozzle in a three-dimensional view.
Figure 32:
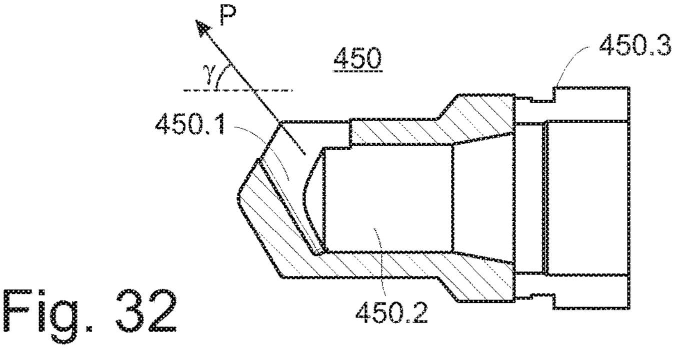
FIG. 32 shows the sixth embodiment of the nozzle in the longitudinal section.

Instead, the angle adapter can also be equipped with a nozzle 450. The nozzle 450 is illustrated in FIGS. 31 and 32. The nozzle 450 is formed so that it sprays the powder at an angle of around 45°. The nozzle slit 450.1 furthermore does not extend over the entire width of the powder channel, as in the case of the nozzles 5, 150, 250, and 350.

The nozzles 5, 150, 250, 350, and 450 can be set in their rotational position with respect to the longitudinal axis LA2. For this purpose, the cap nut 9 is released to the extent that the nozzle and the electrode holder 35 can be rotated about the longitudinal axis LA2 into the desired rotational position. The cap nut 9 is subsequently tightened again, so that the nozzle and the electrode holder are fixed in their new rotational position. Due to the fact that the nozzles can be rotated, the angle adapter obtains an additional degree of freedom. The powder spray direction can thus also be changed by an additional angle.

The preceding description of the exemplary embodiments according to the present invention only serves illustrative purposes. Various changes and modifications are possible in the context of the invention. For example, the different components of the powder spray device or of the angle adapter, respectively, shown in FIGS. 1 to 32 can thus also be combined in a way, which differs from the way shown in the figures.

LIST OF REFERENCE NUMERALS

1 housing
1.1 housing outer surface
1.2 thread
1.4 stop
1.13 locking lugs
2 upstream powder channel
2.1 channel section
2.2 channel section
3 pivot body
3.1 thread
3.13 locking lugs
4 downstream powder channel
5 nozzle
5.3 ledge
5.4 groove
6 web at the pivot body
7 groove at the pivot body
8 labyrinth
9 cap nut
10 high voltage line
10.1 portion of the high voltage line
10.2 portion of the high voltage line
10.3 portion of the high voltage line
11 high voltage electrode
12 wire end
14 bearing surface
15 cap nut
16 seal
17 powder mixer
17.1 tapering section
17.2 section with constant cross section
17.3 widening section
18 web at the housing
19 groove at the housing
20 gas line
20.1 portion of the gas line
20.2 portion of the gas line
20.3 portion of the gas line
21 threaded sleeve
21.1 thread
21.2 groove
21.4 annular groove

22 angle scale
23 reference mark
24 angle scale
26 securing sleeve
26.1 thread
26.2 groove
30 axis
31 axis
35 electrode holder
35.4 web at the electrode holder
36 powder mixer
37 sealing ring
39 contact ring or O ring, respectively
40 gun barrel
40.1 thread
40.2 reference mark
41 powder channel
42 powder channel
43 sleeve
43.3 shoulder
47 mixer
47.1 blade
47.2 blade
47.3 blade
47.4 blade
50 nozzle
51 protection plate
57 mixer
57.1 blade
57.2 blade
57.3 blade
57.4 blade
60 tool
60.1 handle
60.2 web
60.3 web
67 mixer
67.1 blade
67.2 blade
67.3 blade
150 nozzle
150.1 nozzle slit
150.2 powder channel
150.3 ledge
150.4 groove
250 nozzle
250.1 nozzle slit
250.2 powder channel
250.3 ledge
250.4 groove
350 nozzle
350.1 nozzle slit
350.2 powder channel
350.3 ledge
350.4 groove
450 nozzle
450.1 nozzle slit
450.2 powder channel
450.3 ledge
450.4 groove
LA1 longitudinal axis
LA2 longitudinal axis
DA axis of rotation
P powder stream
x axis
y axis
z axis
$\alpha$ angle
$\beta$ angle
$\vartheta$ pivot angle
$\Delta$ angle of rotation
$\gamma$ angle
$\omega$ angle

The invention claimed is:

1. An angle adapter for a powder spray device, comprising an upstream housing, which has an upstream powder channel, a connection to the powder spray device, and a longitudinal axis, about which the housing can be rotated, comprising a pivot body comprising a downstream powder channel, which connects to the upstream powder channel, wherein the pivot body can be pivoted about a pivot axis, whereby the pivot axis runs obliquely to the longitudinal axis, comprising a nozzle, which connects to the pivot body, comprising a high voltage line, which extends from the upstream housing via the pivot body all the way into the nozzle and which is formed there as high voltage electrode, wherein the housing and the pivot body further comprising several webs and grooves, whereby the webs protrude into the grooves, and the webs and grooves are formed so that they form a labyrinth in order to enlarge the distance between the high voltage line and the outer side of the angle adapter.

2. The angle adapter according to claim 1, wherein the upstream powder channel tapers and the downstream powder channel widens again in the pivot body.

3. The angle adapter according to claim 1, comprising a gas line, wherein a portion of the gas line leads through the upstream housing, and another portion of the gas line leads through the pivot body and the gas line is provided in order to transport gas to the high voltage electrode.

4. The angle adapter according to claim 3, wherein the portion of the gas line arranged in the housing is connected to the labyrinth on the outlet side.

5. The angle adapter according to claim 3, wherein the portion of the gas line arranged in the pivot body is connected to the labyrinth on the inlet side.

6. The angle adapter according to claim 1, further comprising a dielectric provided in the labyrinth.

7. The angle adapter according to claim 6, wherein the dielectric is an inert gas or high voltage grease.

8. The angle adapter according to claim 1, wherein the downstream powder channel has a longitudinal axis, which runs obliquely to the pivot axis.

9. The angle adapter according to claim 1, wherein the upstream powder channel has an upstream channel section, which runs concentrically to the longitudinal axis, and wherein the upstream powder channel has a downstream channel section, which runs concentrically to the pivot axis.

10. The angle adapter according to claim 1, further comprising a contact ring provided at a transition from the upstream housing to the pivot body, in order to connect a portion of the high voltage line, which is located in the upstream housing, to the portion of the high voltage line, which is located in the pivot body.

11. The angle adapter according to claim 10, wherein the contact ring is arranged adjacent to the powder channel.

12. The angle adapter according to claim 10, wherein the contact ring is arranged between the powder channel and the gas line, viewed in a radial direction.

13. The angle adapter according to claim 1, further comprising a seal is provided in the outer region of the transition from the housing to the pivot body, wherein the seal seals the labyrinth in a gas-tight manner to the outside.

14. The angle adapter according to claim 1, comprising a clamping nut, which is arranged at the transition from the housing to the pivot body and which is provided to fasten the pivot body to the housing.

15. The angle adapter according to claim 14, wherein the clamping nut is made of an electrically non-conductive material.

16. The angle adapter according to claim 1, wherein the labyrinth has a width of between 0.1 mm and 0.8 mm.

17. The angle adapter according to claim 1, further comprising an outlet of the upstream powder channel and an inlet of the downstream powder channel are formed in such a way that they can be tightly connected to one another.

18. The angle adapter according to claim 1, further comprising a powder mixer is provided in the upstream region of the downstream powder channel.

19. The angle adapter according to claim 18, wherein the cross section of the powder mixer tapers first and widens again later, viewed in a flow direction.

20. The angle adapter according to claim 18, wherein the powder mixer has blades, in order to provide the powder, which flows through the powder channel, with a spin.

21. The angle adapter according to claim 10, wherein the contact ring is formed as a conductive O ring.

22. The angle adapter according to claim 1, comprising a threaded sleeve, via which the housing can be connected to a gun barrel, whereby the threaded sleeve is formed in such a way that it provides for a rotation of the angle adapter with respect to the gun barrel in the released state.

23. A method for setting the spray direction of a powder spray device comprising the angle adapter according to claim 1 with the steps:

a clamping nut, which connects the housing and the pivot body to one another, is released, the pivot body is pivoted into the desired pivot angle position (ϑ) with respect to the housing, and the clamping nut is screwed down.

24. The method according to claim 23, which comprises the steps:

the threaded sleeve, which connects the housing-to the gun barrel, is released, the angle adapter is rotated into the desired position with respect to the gun barrel, and the threaded sleeve is screwed down.

* * * * *